United States Patent [19]

Kobayashi

[11] 4,262,687

[45] Apr. 21, 1981

[54] ELECTROMAGNETIC VALVE SECURITY DEVICE FOR FUEL SUPPLIES

[75] Inventor: Toshiji Kobayashi, Takamori, Japan

[73] Assignee: Iida Sankyo Co., Ltd., Iida, Japan

[21] Appl. No.: 959,965

[22] Filed: Nov. 13, 1978

[30] Foreign Application Priority Data

Nov. 11, 1977 [JP] Japan ............ 52/134764

May 29, 1978 [JP] Japan ............ 53/71581[U]

[51] Int. Cl.[3] ............ F16K 17/36

[52] U.S. Cl. ............ 137/39; 137/78.4; 137/624.12; 251/129; 251/137; 361/154; 361/194

[58] Field of Search ............ 137/38, 39, 78 B, 78 C, 137/624.12; 251/129, 137; 361/154, 194

[56] References Cited

U.S. PATENT DOCUMENTS

| | | | |
|---|---|---|---|
| 1,325,048 | 12/1919 | Simon | 361/154 X |
| 2,611,643 | 9/1952 | Higgins | 251/129 X |
| 2,648,034 | 8/1953 | Douglas | 361/154 |
| 2,718,951 | 9/1955 | Mason | 361/154 X |
| 3,080,508 | 3/1963 | Hipple | 361/154 |
| 3,524,471 | 8/1970 | Bresser | 137/624.12 |
| 3,625,476 | 12/1971 | Meir | 251/129 |
| 3,906,294 | 9/1975 | Lourigan | 251/129 X |
| 4,065,096 | 12/1977 | Frantz | 251/137 X |
| 4,078,709 | 3/1978 | Jenkins | 361/194 |
| 4,098,284 | 7/1978 | Yamada | 137/39 |

*Primary Examiner*—Robert G. Nilson

*Attorney, Agent, or Firm*—Sughrue, Rothwell, Mion, Zinn and Macpeak

[57] ABSTRACT

An electromagnetic valve circuit used in a fluid line security device is disclosed. The circuit is adapted to open and close a fuel supply pipe. The circuit includes an attracting circuit and a holding circuit connected to one side of a power source. The attracting circuit including an attracting switch is in parallel with the attraction holding circuit. The attracting switch is closed only when the attraction phase of value opening is to be accomplished. In one modification the series circuit of the attracting switch and the electromagnetic valve circuit is coupled in parallel to a circuit formed by a hazard detecting switch, and a relay switch operating coil. In another modification a time limit current control is connected in series with the valve coil to control the supply of current to the coil for a predetermined time limit.

9 Claims, 9 Drawing Figures

ELECTROMAGNETIC VALVE SECURITY DEVICE FOR FUEL SUPPLIES

BACKGROUND OF THE INVENTION

This invention relates to an electromagnetic valve in a security device for fuel, such as natural gas, propane or the like, in which an electromagnetic valve circuit is used to open and close a pipe through which fuel flows. The circuit is made up of an attracting circuit and an attraction holding circuit.

The performance of an electromagnetic valve is as shown in FIG. 1; that is, when the electromagnetic valve carries out the attraction phase, it requires a large attracting current $I_O$ according to the valve stroke; however, after being attracted, the electromagnetic valve can be maintained attracted with a small attraction holding current $I_M$. In a conventional electromagnetic valve operating method, current for attraction is allowed to flow in the electromagnetic valve at all times. Therefore, the conventional electromagnetic valve operating technique is disadvantageous in that current is consumed wastefully where the electromagnetic valve is placed in the attraction state for a long period of time.

Accordingly, in view of the above-described difficulties accompanying the conventional method, an object of this invention is to provide an electromagnetic valve in a security device for fuel, in which no wasteful current consumption is caused when the electromagnetic valve is maintained open by applying current thereto for a long period of time.

Another object of this invention is to provide an electromagnetic valve circuit in a security device for fuel that eliminates the generation of heat when the reset switch is closed erroneously such that the electromagnetic valve coil draws a large attracting current.

Still another object of this invention is to provide for a valve circuit that minimizes power consumption.

An important aspect of this invention resides in a circuit for an electrogmagnetic valve that is made up of an attracting circuit and an attraction holding circuit. The attracting circuit is connected in parallel to the attraction holding circuit through an attracting switch which is closed only when the attraction is effectuated.

BRIEF DESCRIPTION OF THE DRAWINGS

The accompanying drawings illustrate various embodiments of this invention.

More specifically.

DESCRIPTION OF THE PREFERRED EMBODIMENTS

Figure 1:
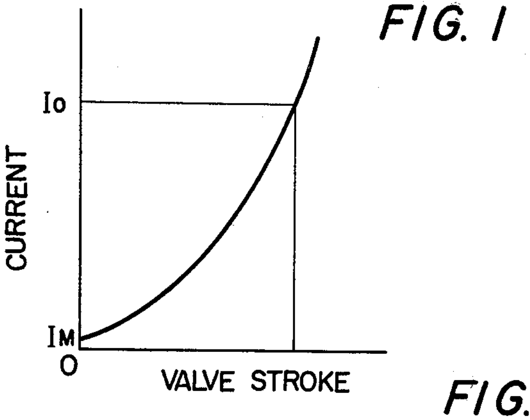
FIG. 1 is a graphical representation indicating the relationships between valve strokes and attracting currents in an electromagnetic valve.

This invention will be described with reference to its preferred embodiments. First, the invention will be described with reference to the security device shown in FIG. 2 for fluid fuel such as gas, which device employs an electromagnetic valve which is electrically opened for a long period of time. In such a security device a timer motor TM is connected to an electric source E, operated at all times. Connected to one terminal of the electric source E are terminal A of a reset switch SW1 and terminal A of a circuit "off" switch SW2. Terminal B of the circuit "off" switch SW2 is connected to terminal C of a relay switch SW3, the other terminal D of which is connected to terminal F of the reset switch SW1. Terminals D and F of switches SW1 and SW3 are connected to one terminal of a primary winding P of a transformer T and to one terminal of a pilot lamp 6. The other terminals of the primary winding P and the pilot lamp 6 are connected through a timer switch SW7 to the other terminal of the electric source E.

One terminal of a secondary winding S of the transformer T is connected to terminal J of a gas leakage detecting switch SW5, a hazard detecting switch, and to terminal G of an attracting switch SW4. Terminal K of the gas leakage detecting switch SW5 is connected to terminal M of an earthquake detecting switch SW6, another hazard detecting switch. Terminal N of the earthquake detecting switch SW6 is connected to one terminal of a relay switch operating coil RL and to one terminal of an attraction holding resistor 2 in an attraction holding circuit. Terminal H of the attracting switch SW4 and the other terminal of the attraction holding resistor 2 are connected to the attracting circuit of a main valve constituted by an electromagnetic valve.

The attracting circuit comprises a valve coil L1. The common or ground terminal of the valve coil L1 and the other terminal of the relay switch operating coil RL are connected to the other terminal of the secondary winding S of the transformer T.

In this circuit, the rests switch SW1 and the attracting switch SW4 are normally-open-switches, and are operated in association with each other. The circuit "off" switch SW2 is a normally-closed-switch. The gas leakage detecting switch SW5 and the earthquake detecting switch SW6 are normally-closed-switches forming an OR circuit. The relay switch SW3 is a normally-open switch. The timer switch SW7 is opened and closed in a period of 24 hours depending on the setting which is adjustable.

The ends of the main valve are connected respectively to a gas flow pipe 3 and a piping 5 of gas utensils 4. The main valve 1 is a normally-closed valve. The pilot lamp 6 is connected between terminal D of the relay switch SW3 and terminal P of the timer switch SW7. The attracting switch SW4 may be designed so that it is operated by the valve coil L1 in such a manner that it is opened and closed in correspondence with the action of the main valve 1.

The operation of the fluid fuel security device of FIG. 2 thus constructed will now be described. The period of time during which the timer switch SW7 is opened is set to the period of time during which no gas is needed (hereinafter referred to as "a gas non-use time period" when applicable). It is assumed, for example that the gas non-use time period is from 12 o'clock p.m. to 6 o'clock a.m. next morning. If the reset switch SW1 is closed by depression during the period of time from 6 a.m. to 12 p.m., then the primary winding P of the transformer T is energized and a voltage is developed across the secondary winding S of the transformer T. As a result, the valve coil L1 of the main valve 1 is energized through the attracting switch SW4 which is closed in association with the depression of the reset switch SW1. An attracting current $I_O$ flows in the valve coil L1, so that the valve 1 is opened. On the other hand, the voltage of the secondary winding S is applied through the gas leakage detecting switch SW5 and the earthquake detecting switch SW6 to the relay switch operating coil RL, the attraction holding resistor 2, and the valve coil L1 of the main valve 1. Thus, the aforementioned attracting current $I_O$ and an attraction holding current $I_M$ passing through the attraction holding resistor 2 both flow in the valve coil L1. The relay switch SW3 of the relay switch operating coil RL is closed by the application of current described above, and therefore the primary winding of the transformer T is maintained energized even if the depression of the reset switch SW1 is released. Upon release of the depression of the reset switch SW1, the attracting switch SW4 is opened. As a result, the application of the attracting current $I_O$ is suspended, and the main valve 1 is maintained opened by the attraction holding current $I_M$.

When a hazard occurs, for example a crack in the gas piping or an earthquake, the hazard detecting switch SW5 or SW6 is opened to suspend the application of current to the valve coil L1 of the main valve 1. As a result, the main valve 1 is closed, so that the supply of gas to the piping 5 is stopped and the pilot lamp 6 is turned off.

In the case of electrical service interruption also, the relay switch SW3 is closed to close the main valve. The main valve 1, once closed, cannot be opened unless the reset switch SW1 and the attracting switch SW4 are closed by depression.

If a user wants to close the main valve 1, for instance before he leaves his house, the circuit "off" switch SW2 can be opened by depression. In this case, the relay switch operating coil RL and the valve coil L1 of the main valve 1 are deenergized, and therefore the main valve 1 is closed. When the main valve 1 is to be opened during a subsequent gas use time period, the reset switch SW1 and the attracting switch SW4 are depressed.

During the period of time during which the timer is not used (hereinafter referred to as "a timer non-use time period", when applicable), the timer switch SW7 is opened. As a result, the relay switch operating coil RL and the valve coil L1 of the main valve 1 are deenergized, the pilot lamp 6 is turned off, and the main valve is closed. When the reset switch SW1 is depressed for the period of time during which the timer is used, as for example, the next morning, the attracting switch SW4 and the relay switch SW3 are closed. As a result, the main valve 1 is opened. If a requirement exists for gas usage during the above-described gas non-use time period, it is necessary to change the "on" period of time in the timer and to depress the reset switch SW1. The timer is designed so that the gas non-use time period can be changed within a range of from, for instance, 2 hours to 8 hours as desired by the user. In the circuit of the security device, the starting side comprising switches SW1, SW2, SW3 and SW7 is separated by the transformer T from the operating side comprising the main valve 1, the switches SW4, SW5 and SW6, and the relay switch operating coil RL. Therefore, even if the voltage of the electric source E is high, the circuit can operated at a low voltage. Accordingly, difficulties such as electric shock caused by the leakage of high voltage into gas utensils can be prevented; that is, security is improved. In addition, as the relay switch SW3 is provided on the side of the primary winding of the transformer T and the relay switch operating coil RL is provided on the side of the secondary winding S of the transformer T, the current flowing in the primary winding side of the transformer T is interrupted when the main valve 1 is closed. This is advantageous in view of power consumption and security.

Figure 3:
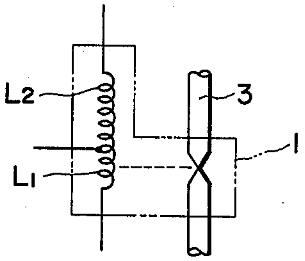
FIG. 3 is an explanatory diagram showing one example of an electromagnetic valve provided with an attracting valve coil and an attraction holding valve coil.

As shown in FIG. 3 a main valve 1 is provided with an attracting valve coil L1 and an attraction holding valve coil L2. When it is required to close the main valve 1, an attracting current $I_O$ is allowed to flow in the attracting valve coil L1 to attract the main valve. The main valve thus attracted is maintained in position by feeding an attraction holding current $I_M$ to a series circuit of the attracting valve coil L1 and the attraction holding coil L2. The same effect can be obtained by allowing a large current $I_O$ and a small current $I_M$ to flow respectively in an attracting valve coil L1 and an attraction holding valve coil L2 provided separately for the main valve 1.

Figure 2:
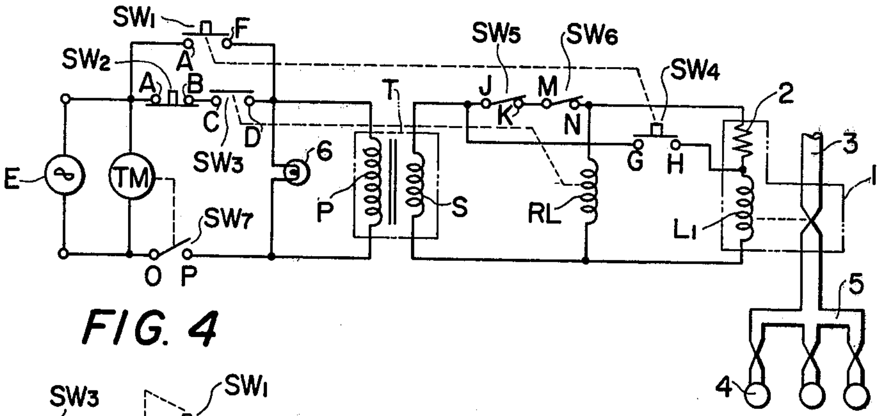
FIG. 2 is a circuit diagram showing one example of a fluid fuel security device with an electromagnetic valve according to the invention.
Figure 4:
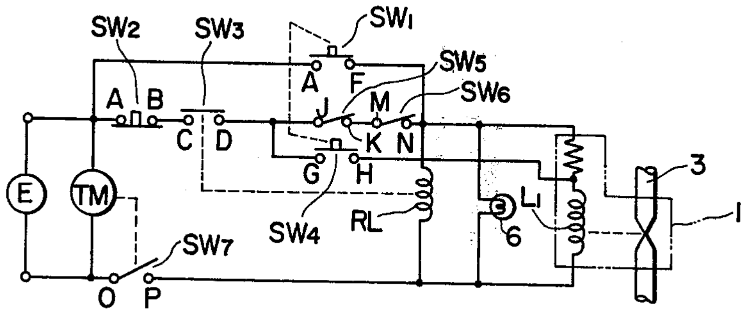
FIG. 4 is a circuit diagram showing another example of the fluid fuel security device without a transformer.

FIG. 4 shows a modification of the FIG. 2 circuit obtained by directly connecting the starting side and the operating side by removing the transformer T. More specifically, a circuit "off" switch SW2, a relay switch SW3 and a gas leakage detecting switch SW5 and an earthquake detecting switch SW6 are connected in series to one terminal of an electric source E. A reset switch Sw1 is connected in parallel to this series circuit, with terminal D of the relay switch SW3 being connected to an attracting switch SW4. A relay switch operating coil RL and a pilot lamp 6 are connected between terminal F of the reset switch SW1 and terminal P of a timer switch SW7. In this circuit, the circuit is applied to the relay switch operating coil RL directly by closing the reset switch SW1.

The operation of the circuit shown in FIG. 4 will now be described. Similar to the circuit shown in FIG. 2, during the gas use time period, the reset switch SW1 and the attracting switch SW4 are closed to apply an attracting current $I_O$ to the valve coil L1 of the main valve 1 and to apply an attraction holding current $I_M$ through an attraction holding resistor 2 to the valve coil L1. At the same time, the relay switch operating coil RL is energized to close the relay switch SW3. Upon closure of the relay switch SW3, the supply of current to the relay switch operating coil RL, the attraction holding resistor 2 and the valve coil L1 is maintained even if the depression of the reset switch SW1 is released. Therefore, the main valve 1 thus attracted is maintained open by the attraction holding current $I_M$.

The electric source E may be the commercial power supply or a battery electric source. A synchronous motor or a step motor is used as the timer motor depending on the electric source employed in the circuit.

Figure 5:
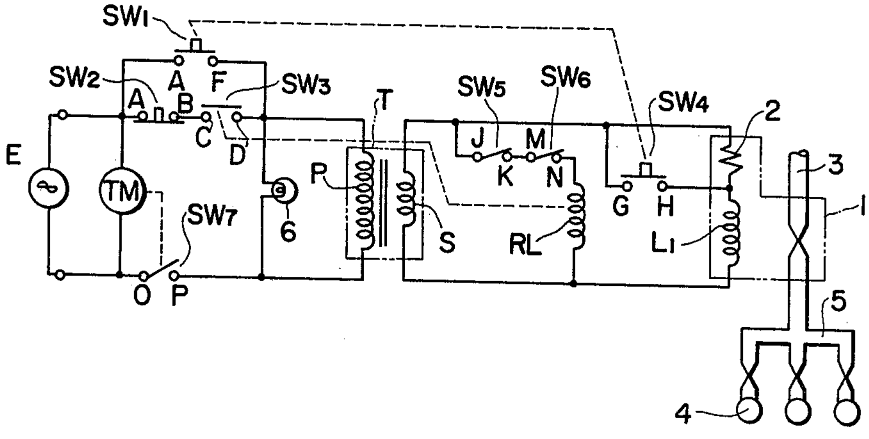
FIG. 5 is a circuit diagram showing one modification of the device shown in FIG. 2.

FIG. 5 shows another modification of the circuit shown in FIG. 2. The attracting switch SW4, the attraction holding resistor 2, and the gas leakage detecting switch SW5 are connected to one terminal of the secondary winding S of the transformer T. The other terminal of the attracting switch SW4 and the other terminal of the attraction holding resistor 2 are connected to one terminal of the valve coil L1 in the attracting circuit. The other common terminal of the valve coil L1 is connected to the other terminal of the secondary winding S of the transformer T. The gas leakage detecting switch SW5 is connected to the series circuit of the earthquake detecting switch SW6 and the relay switch operating coil which is connected to the secondary winding S of the transformer T.

In the above description, the electromagnetic valve is employed as the main valve for gas which is fluid fuel. However, this invention may be applied to the attracting circuit and attraction holding circuit of electromagnetic valves which are used for other fluid fuels.

With the electromagnetic valve operating circuit constructed as was described above, the electromagnetic valve can be attracted and held with 1/10 of the attracting current. Therefore, ineffective, or useless, current flows in the circuit, and the electrical capacity of the circuit can be so small because the attracting current is allowed to flow therein for only a short time.

Also, since the attracting switch and the attracting electromagnetic valve circuit are connected in parallel to the hazard detecting switch group to bypass the flow of current, the electrical capacity of the hazard detecting switch group can be small. Because the amount of current flowing through the switches is decreased, problems such as poor conduction due to the wear of the contacts thereof is eliminated, which leads to the stable operation of the device.

As demonstrated in the above described embodiments, the valve coil of the main valve 1 requires a large attracting current $I_O$ for the valve stroke during the attraction phase. Once that phase is complete the attraction state can be maintained with a small attraction holding current $I_M$ as shown in FIG. 1.

In all of the circuits shown in FIGS. 2, 4 and 5, the attracting switch SW4 is operated in conjunction with the reset switch SW1. Hence during the conduction phase, current switching is manually accomplished by ganged operation of the switches. Therefore, if the reset switch is erroneously depressed for a long period of time a large attracting current will flow in the transformer T or in the electromagnetic valve coil L1. However, the capacity of the transformer is small because it is designed for maintaining the low level attraction holding current and not for a long time period of the large attracting current. Hence, problems of heat generation may occur in the transformer T of the electromagnetic valve coil L1 of the prior embodiments if reset switch is inadvertantly held depressed.

In view of this potential problem, the embodiments of FIGS. 6–9 provide an electromagnetic valve circuit in a security device for fuel wherein even if the reset switch is erroneously closed for a long period of time, no abnormally high heat will be generated in either the transformer or the electromagnetic valve coil as a result of the large attracting current.

Figure 6:
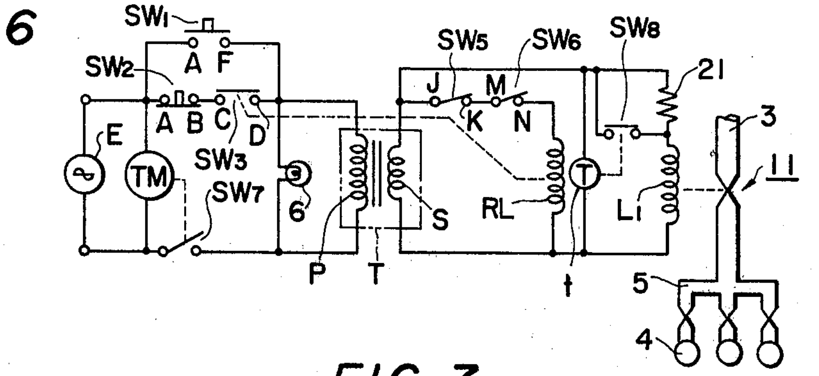
FIG. 6 is a circuit diagram showing one example of a modified security device for fluid fuel employing an electromagnetic valve circuit according to this invention.

Referring now to FIG. 6, a timer motor TM is connected to an electric source E and is operated at all times. One terminal of the electric source E is connected to terminal A of a reset switch SW1 and to terminal A of a circuit "off" switch SW2. Terminal B of the "off" switch is connected to one terminal of a relay switch SW3. Terminal D of the relay switch SW3 is connected to terminal F of the reset switch SW1.

The remaining terminals D and F of switches SW1 and SW3 are connected to one end of a primary winding P of a transformer T and to one terminal of a pilot lamp 6. The other end of the primary winding P and the other terminal of the pilot lamp 6 are connected through a timer switch SW7 to the other terminal of the electric source E. One end of a secondary winding S of the transformer T is connected to terminal J of a hazard detecting switch, namely, a gas leakage detecting switch SW5, one terminal of a timer t, one terminal of a timer switch SW8, and one terminal of an attraction holding fixed resistor 21. The other terminals of the timer switch SW8 and attraction holding fixed resistor 21 are connected to one terminal of an electromagnetic valve coil L1. The other terminal K of the gas leakage detecting switch SW5 is connected to terminal M of another hazard detecting switch, namely, an earthquake detecting switch SW6. Terminal N of switch SW6 is connected to one terminal of a relay switch operating coil RL. The other terminals of the relay switch operating coil RL, timer t and electromagnetic valve coil L1 are connected to the other end of the secondary winding S of the transformer T.

The reset switch SW1 is a normally-open switch, and the circuit "off" switch SW2 is a normally-closed switch. The hazard detecting switches, that is, the gas leakage detecting switch SW5 and the earthquake detecting switch SW6, are normally-closed switches forming an OR circuit. The relay switch SW3 is a normally-open switch which is opened upon energization of the relay switch operating coil RL. The timer switch SW7 is operable over a 24-hour period, and its open and closed periods can be set as desired. The ends of the main valve 11 are connected respectively to a gas flow pipe 3 and a piping 5 of gas utensils 4. The main valve 11 is a normally-closed valve.

The operation of the security device of FIG. 6 for fuel will now be described. The period of timer during which the timer switch SW7 is open is set by timer TM to a gas non-use time period for example the time period during which the user is asleep. For instance, the gas non-use time period may be set to six hours from 00:00 to 06:00 hours. When the reset switch SW1 is depressed, or closed, during the 18-hour interval from 06:00 o'clock to 00:00 o'clock, the primary winding P of the transformer T is energized, and a voltage is developed across the secondary winding S of the transformer T. Therefore, the timer t is operable so that the timer switch SW8 is closed in association with the operation of the timer t. As a result, a large attracting current flows in the electromagnetic valve coil L1, and therefore the main valve 11 is closed. On the other hand, the voltage developed across the secondary winding S is applied through the hazard detecting switches to the relay switch operating coil RL and directly to the attraction holding fixed resistor 21. Accordingly, a large attracting current passing through the timer switch SW8 is applied to the electromagnetic valve coil L1 when the latter performs the attraction step. The relay switch SW3 of the relay switch operating coil RL is closed by the energization described above, and therefore in the primary side of the transformer T the supply of current to the transformer is maintained even if the reset switch SW1 is released to open position. When a period of time set by the timer t elapses, the timer switch SW8 is opened, and therefore a small attraction holding current passed through the attraction holding fixed resistor 21 is supplied to the electromagnetic valve coil L1 to maintain the main valve open.

When either the gas leakage detecting switch SW5 or the earthquake detecting switch SW6 is opened, the supply of current to the electromagnetic valve coil L1 of the main valve 11 is suspended. Therefore, the main valve is opened and the supply of gas to the piping 5 of the gas utensils 4 is stopped. In this case, the pilot lamp 6 is also turned off. In the case of a service interruption also, the relay switch SW3 is opened, so that the main valve 11 is closed.

The main valve 11 thus closed cannot be opened without depressing (or closing) the reset switch SW1. If the user wants to close the main valve 11, for instance, before he leaves his house, the circuit "off" switch SW2 should be opened by depressing it. In this case, the relay switch operating coil RL and the valve coil L1 of the main valve 11 are deenergized, and therefore the main valve 11 is closed. When the main valve 11 is again to be opened during the gas use period of time, the reset switch SW1 should be closed by depressing it.

During the timer non-use time period, the timer switch SW7 is opened. As a result, the relay switch operation coil RL and the electromagnetic valve coil L1 of the main valve 11 are deenergized. The pilot lamp 6 is turned off, and the main valve 11 is closed. When the use of gas during the gas non-use time period is required, it is necessary to reset the gas non-use time period and then to depress (or close) the reset switch SW1. The timer is designed so that the gas non-use time period can be changed within a range of from 2 hours to 8 hours as selected by the user.

Figure 7:
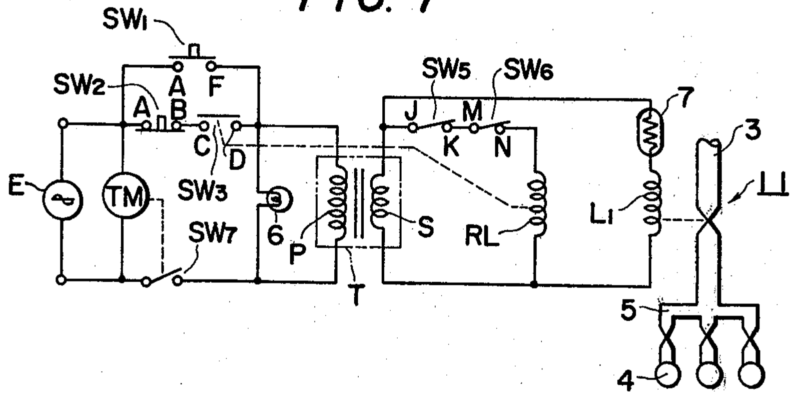
FIG. 7 is a circuit diagram showing a second example of the modified security device for fluid fuel employing the electromagnetic valve circuit according to the invention.

Shown in FIG. 7 is one modification of the security device shown in FIG. 6. One end of a secondary winding S of a transformer T is connected to terminal J of the aforementioned hazard detecting switch, namely, the gas leakage detecting switch SW5 and to one terminal of a posistor 7. Terminal K of the gas leakage detecting switch SW5 is connected to terminal M of another hazard detecting switch, namely, the earthquake detecting switch SW6. Terminal N of switch SW6 is connected to one terminal of a relay switch operating coil RL. The other terminal of the posistor 7 is connected to an electromagnetic valve coil L1. The other terminals of the electromagnetic valve coil L1 and relay switch operating coil RL are connected to the other end of the secondary winding S of the transformer T.

In operation, upon depressing (closure) of the reset switch SW1, a voltage developed across the secondary winding S of the transformer T is applied to the posistor 7. Immediately after the application of the voltage, the resistance of the posistor 7 is small, and therefore a large attracting current flows in the electromagnetic valve coil L1, and the main valve 11 is closed. Thereafter, as the temperature of the posistor 7 reaches a predetermined value, its resistance increases. As a result, a small attraction holding current flows in the electromagnetic valve coil L1, so that the main valve 11 is maintained operated.

Figure 8:
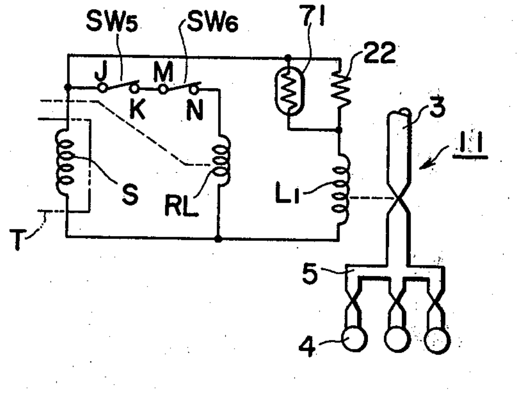
FIG. 8 is a circuit diagram showing a third example of the modified security device for fluid fuel employing the electromagnetic valve circuit according to the invention.

FIG. 8 shows another modification of the security device shown in FIG. 6. In the security device shown in FIG. 8, one terminal of a secondary winding S of a transformer T is connected to terminal J of the above-described gas leakage detecting switch SW5, terminal of a posistor 71 and terminal of an attraction holding fixed resistor 22. Terminal K of the gas leakage detecting switch SW5 is connected to terminal M of the earthquake detecting switch SW6. Terminal N of switch SW6 is connected to one terminal of a relay switch operating coil RL. The other terminals of the posistor 71 and attraction holding fixed resistor 22 are connected to one terminal of an electromagnetic valve coil L1. The other terminal of the electromagnetic valve coil L1 and relay switch operating coil RL are connected to the other end of the secondary winding S of the transformer T.

In operation, upon depression (closure) of the reset switch SW1 (not shown), a voltage developed across the secondary winding S of the transformer T is applied to the posistor 71 and the attraction holding fixed resistor 22. Immediately after the application of the voltage, the resistance of the posistor 71 is small. Therefore, a large attracting current passed through the posistor 71 and a small attraction holding current passing through the resistor 22 are allowed to flow in the electromagnetic valve coil L1 to open the main valve. Thereafter, as the temperature of the posistor 71 reaches a predetermined value, the resistance of the posistor 71 is increased. As a result, small attraction holding currents passing through the posistor 71 and the resistor 22 are allowed to flow in the electromagnetic valve coil L1 and the main valve 11 is maintained opened.

Figure 9:
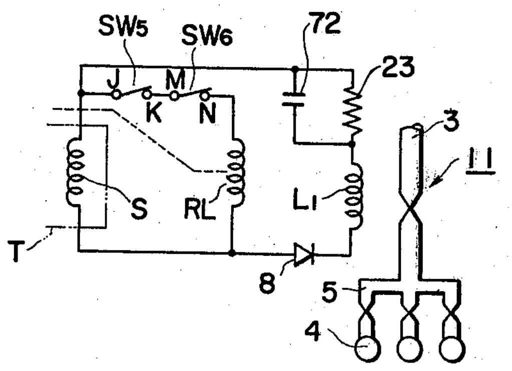
FIG. 9 is another circuit diagram showing a fourth example of the modified security device for fluid fuel employing the electromagnetic valve circuit according to the invention.

A further modification of the security device shown in FIG. 6 is illustrated in FIG. 9. In this modification, one end of a secondary winding S of a transformer T is connected to terminal J of the gas leakage detecting switch SW5 described above, one terminal of a capacitor 72 and one terminal of an attraction holding fixed resistor 23. Terminal K of the gas leakage detecting switch SW5 is connected to terminal M of the earthquake detecting switch SW6. Terminal N of switch SW6 is connected to one terminal of a relay switch operating coil RL. The other terminals of the capacitor 72 and fixed resistor 23 are connected to one terminal of an electromagnetic valve coil L1, the other terminal of which is connected through a diode 8 to the other terminal of the relay switch operating coil RL and other end of the secondary winding S of the transformer T.

In operation, when the reset switch SW1 (not shown) is closed (or depressed), a voltage developed across the secondary winding S of the transformer T is applied to the capacitor 72 and the attraction holding fixed resistor 23. During the initial period of time after the application of the voltage, the capacitor 72 is being charged, and therefore a large attracting current comprising the current charging the capacitor 72 and a current passing through the fixed resistor 23 is allowed to flow in the electromagnetic valve coil L1 to open the main valve 11. When the capacitor 72 is fully charged, only a small attracting current passing through the fixed resistor 23 is allowed to flow in the electromagnetic valve coil L1, so the main valve 11 is maintained opened.

As is apparent from the above description, according to these embodiments of the invention, even if the reset switch is erroneously depressed (closed) for a long time, abnormally high heat over the upper limit of the temperature range of the elements is never generated in either the transformer or in the electromagnetic valve coil. After the large attracting current necessary for opening the main valve is applied to the electromagnetic valve coil, the large attracting current is automatically replaced by the small attraction holding current.

For this reason, the capacity of the transformer or the electromagnetic valve coil may be smaller than customarily used which leads to miniaturization of the device itself and the economical use of the same. Furthermore, as was described above, after the large attracting current is applied to the electromagnetic valve coil for an extremely short period of time required for opening the main valve, the large attracting current is replaced by the small attraction holding current. Therefore, the power consumption is reduced, which results in the direct saving of energy. Thus, the main valve can be controlled economically. Although embodiments and modifications have been shown, it is apparent that other changes may be made without departing from the essential scope of this invention.

What is claimed is:

1. An electromagnetic valve security device for fluid fuel, comprising a source of electric power, an electromagnetic valve operative to open and close a fuel flow pipe, and an electromagnetic valve circuit operating said valve, the improvement wherein said valve circuit comprises an attracting circuit including a valve coil for operating said valve, an attraction holding circuit, a terminal of said attraction holding circuit being coupled to one terminal of said electric source, and an attracting switch coupled to said valve coil, one terminal of said attracting circuit being coupled to said one terminal of said electric source in parallel to said attraction holding circuit through said attracting switch, said attracting switch being closed only when attraction operation for said valve coil is effected, and the other terminal of said attracting circuit being connected to a second terminal of said electric power source; said valve circuit further comprising a transformer interposed between said power source and said electromagnetic valve circuit, said attraction circuit and said attraction holding circuit being disposed on the secondary side of said transformer; a relay switch operating coil in parallel with the secondary side of said transformer; and a hazard detecting switch in series with said relay switch operating coil and in parallel with the secondary side of said transformer.

2. An electromagnetic valve security device for fluid fuel, comprising a source of electric power, an electromagnetic valve operative to open and close a fuel flow pipe, and an electromagnetic valve circuit operating said valve, the improvement wherein said valve circuit comprises an attracting circuit including a valve coil for operating said valve, an attraction holding circuit, a terminal of said attraction holding circuit being coupled to one terminal of said electric source, and an attracting switch coupled to said valve coil, one terminal of said attracting circuit being coupled to said one terminal of said electric source in parallel to said attraction holding circuit through said attracting switch, said attracting switch being closed only when attraction operation for said valve coil is effected, and the other terminal of said attracting circuit being connected to a second terminal of said electric power source; said valve circuit further comprising a hazard detecting switch means in series with a relay switch operating coil, and wherein a series circuit of said attracting switch and said electromagnetic valve circuit is coupled in parallel to the series circuit of said hazard detecting switch means and said relay switch operating coil.

3. The improvement as claimed in claim 2 wherein said hazard detecting switch means comprises two detecting switches, the first detecting switch being responsive to gas leakage and the second detecting switch being responsive to the occurrence of an earthquake.

4. The improvement as claimed in claims 1 or 2 further comprising a first timer in parallel with said source of electric power, said timer adapted to selectively prevent electric power from actuating said electromagnetic valve circuit during predetermined periods of time.

5. The improvement as claimed in claim 4 further comprising a pilot lamp in parallel with said source of electric power and in parallel with said attraction circuit and adapted to be lit whenever power is applied to said electromagnetic valve circuit.

6. The improvement of claim 4 further comprising time limit current control means coupled between said power source and said valve coil and adapted to control the magnitude of current through said electromagnetic valve coil in a time limit mode when said valve circuit is actuated.

7. The improvement as claimed in claim 6 wherein said attraction holding circuit comprises a fixed resistor in series with said valve coil, and wherein said time limit current control means comprises a second timer, said attracting switch being operated by said second timer and being connected in parallel to said fixed resistor.

8. The improvement of claim 2 further comprising a transformer interposed between said power source and said electromagnetic valve circuit, said attraction circuit and said attraction holding circuit being disposed on the secondary side of said transformer.

9. The improvement of claim 8 wherein said series circuit of said hazard detecting switch means and said relay switch operating coil is in parallel with the secondary side of said transformer.

* * * * *